United States Patent
Littlewood et al.

(10) Patent No.: US 7,209,603 B2
(45) Date of Patent: Apr. 24, 2007

(54) ACOUSTO-OPTICAL DEVICE BASED ON PHONON-INDUCED POLARITONIC BAND GAPS

(75) Inventors: Peter Brent Littlewood, Cambridge (GB); Alexander L. Ivanov, Cardiff (GB)

(73) Assignees: University College Cardiff Consultants Limited, Cardiff (GB); Cambridge University Technical Services Limited, Cambridge (GB)

( * ) Notice: Subject to any disclaimer, the term of this patent is extended or adjusted under 35 U.S.C. 154(b) by 104 days.

(21) Appl. No.: 10/488,440

(22) PCT Filed: Sep. 4, 2002

(86) PCT No.: PCT/GB02/04024

§ 371 (c)(1),
(2), (4) Date: May 10, 2004

(87) PCT Pub. No.: WO03/021342

PCT Pub. Date: Mar. 13, 2003

(65) Prior Publication Data

US 2004/0247224 A1 Dec. 9, 2004

(30) Foreign Application Priority Data

Sep. 4, 2001 (GB) .................................. 0121448.5

(51) Int. Cl.
*G02F 1/335* (2006.01)
*H01S 3/00* (2006.01)

(52) U.S. Cl. .................. 385/7; 385/1; 385/2; 385/8; 385/10; 385/11; 385/31; 359/333; 359/341.1; 359/341.31; 359/346

(58) Field of Classification Search .............. 385/1, 385/2, 3, 7, 8, 9, 10, 39, 40, 14, 122, 37, 385/13, 11, 31; 359/333, 341.1, 341.31, 359/346
See application file for complete search history.

(56) References Cited

U.S. PATENT DOCUMENTS

| | | | |
|---|---|---|---|
| 6,751,368 B2* | 6/2004 | Lim et al. | 385/14 |
| 6,925,226 B2* | 8/2005 | Lim et al. | 385/32 |
| 2002/0094150 A1* | 7/2002 | Lim et al. | 385/15 |
| 2004/0247224 A1* | 12/2004 | Littlewood et al. | 385/7 |

OTHER PUBLICATIONS

Irby, J. H. et al.: "Calculation of Deltan2 and Kappa for an Acoustically Induced Distribution Bragg Reflector (ADBR)", IEEE Journal of Quantum Electronics, IEEE Inc., New York, US, vol. 34, No. 2, Feb. 1, 1998, pp. 213-224, XP000737230.
Ivanov, A. L. et al.: "Acoustically Induced Stark Effect for Excitons in Intrinsic Semiconductors", Physical Review Letters, Sep. 24, 2001, APS, USA, vol. 87, No. 13, pp. 136403/1-4, XP002223216.

* cited by examiner

*Primary Examiner*—Brian M. Healy
(74) *Attorney, Agent, or Firm*—Pearne & Gordon LLP

(57) ABSTRACT

The device comprises an optical waveguide and an acoustic wave generating device. The waveguide has an optical band gap and a sharp electronic transition (e.g. an excitonic transition) in the band gap, and the acoustic wave generating device generates acoustic waves within the waveguide. Light passing through the waveguide is of a frequency within the band gap of the waveguide and is nearly resonant with the sharp electronic transition. The wave generating device is arranged to generate acoustic waves so as to induce optical band gas in the polariton spectrum, thereby affecting the transmission of the light passing through the waveguide, the transmission of which is thereby affected.

22 Claims, 4 Drawing Sheets

ACOUSTO-OPTICAL DEVICE BASED ON PHONON-INDUCED POLARITONIC BAND GAPS

This application claims the benefit of International Application No. PCT/GB02/04024, which was published in English on Mar. 13, 2003.

BACKGROUND OF THE INVENTION

The present invention relates to the use of the Stark effect for acoustically changing the optical properties of a material.

In a solid material, the propagation of light is controlled by the electronic polarisation of the medium. For the simple case of a transparent medium, electronic excitation of the medium can be used to modify the light dispersion properties of the medium by modifying the refractive index. This produces a constant change in the speed of light through the medium. In this way a coherent beam or pulse of acoustic phonons in a material will modify the properties of the material in order to change the refractive index of that material.

When there are electronic resonances at particular energies, the dielectric function has a resonance at the energy of the electronic excitation, and strong frequency-dependence. The excitations may come about from, from example, localised electronic excitations as in impurity levels in a glass, or extended electronic excitations at a semiconductor band edge, or excitations of bound electron-hole pairs (excitons) in a semiconductor.

Because of the electronic resonance, the optical field and the polarisation are coupled, and new coupled modes are generically termed polaritons. A polariton spectrum is shown in FIG. 1.

The Stark effect refers to the modulation of the frequency of the electronic resonance by the application of a field, which may typically be an electrical field or an optical field.

In the electrical Stark effect, a d.c. or low frequency (GHz) voltage bias is applied to shift the position of the resonance, and one common application of this is as a laser modulator—the band gap of a semiconductor is lowered so as to cause absorption of the incident laser light, and thereby to produce extinction of the light propagation.

The optical Stark effect mediated by an excitonic resonance is one of the central concepts of modern semiconductor optics. In these cases one deals with an optically driven semiconductor probed by a weak light. A high-intensity pulse, which resonates with excitons and gives rise to the optical Stark effect, tends to weaken the exciton-photon interaction, and thereby modifies the propagation and absorption of the coupled polariton modes.

A disadvantage of the use of the conventional (optical or electrical) Stark effect in real devices is the requirement that real electronic excitations be created in the solid, with the attendant electrical losses and concomitant reduction in speed of operation.

If a sound wave is present in a solid, the density perturbations produced by rarefaction and compression as the sound wave passes lead to small modulations of the dielectric constant, and therefore the refractive index of the material. These spatial modulations can be used to diffract light, and this is the basis of the science of acousto-optics. Acousto-optics is a well-established discipline, but all of the current applications rely purely on the spatial modulation of the refractive index and deal with a small, non-resonant acousto-optical susceptibility.

SUMMARY OF THE INVENTION

According to the present invention an acousto-optical device comprises an optical waveguide having an optical band gap and a sharp electronic transition in the optical band gap; and an acoustic wave generating device for generating acoustic waves within the waveguide, wherein light passing through the waveguide is of a frequency within the optical band gap of the waveguide and is nearly resonant with the sharp electronic transition; and the wave generating device is arranged to generate acoustic waves at or close to resonance with the light passing through the waveguide, the transmission of which is thereby affected.

By generating acoustic waves at or close to resonance with the light passing through the waveguide, the interaction between the acoustic wave and the light is huge. In fact, it can be so significant that switching the waveguide between transparency and opaqueness can be achieved at low acoustic wave powers.

This invention can be used to achieve significant performance advantages over previously known or proposed devices. For example, traditional acousto-optic devices achieve a low level of interaction between the acoustic waves and the optical waves, such that the acoustic power which needs to be applied to achieve significant interaction is enormous. This invention allows fast switching time and at relatively low energies of acoustic wave.

There are many uses for the optical switch, including modulators, optical filtering, optical beam splitting and frequency modulation.

According to a preferred embodiment, the wave generating device is a transducer disposed on the surface of the waveguide, and in some embodiments, that transducer is arranged to generate surface acoustic waves on the surface of the waveguide. It is also preferred that the waveguide include at least one quantum well for confinement of excitons. This feature is likely to be most important for devices operating at relatively high temperatures.

The waveguide also preferably includes an optical micro cavity for confinement of the optical field. In the preferred embodiment, the waveguide is thin, of the order of a micron in thickness.

The use of an interdigital transducer is also preferred, particularly when the transducer is one arranged to generate surface acoustic waves on the waveguide.

In some embodiments of the invention, the device is arranged such that, when no signal is applied to the transducer, the waveguide is transparent, but that, when a signal is applied to the transducer, the intensity of the transmitted light in a frequency band is reduced. The acousto-optical device could be any one of an optical filter, a modulator, a tunable optical filter, an optical beam splitter, or an optical frequency modulator. Of course, the device could be used in other apparatus also.

According to another aspect of the invention an acousto-optical system comprises an acousto-optical device as referred to above in combination with a signal generator for supplying an electrical signal to the transducer. It is particularly advantageous when the signal generator is arranged to generate signals in a range of amplitudes to control the intensity of the transmission of the light. It is also advantageous for the signal generator to be arranged to generate signals in a range of frequencies to control to the frequency of the band at which light passing through the device is affected. The system can also include a source of the light passing through the device, where the source is preferably a monochromatic light source, and most preferably a laser.

According to a third aspect of the invention, a method of affecting the transmission of light through a transparent waveguide comprises the applying of an acoustic wave to a waveguide of a frequency that is resonant or near resonant with the light passing through it. Preferably, that acoustic wave is a surface acoustic wave applied to the surface of the waveguide.

BRIEF DESCRIPTION OF THE DRAWINGS

The present invention will now be described by way of example only with reference to the accompanying drawings in which.

DETAILED DESCRIPTION OF THE INVENTION

Figure 1:
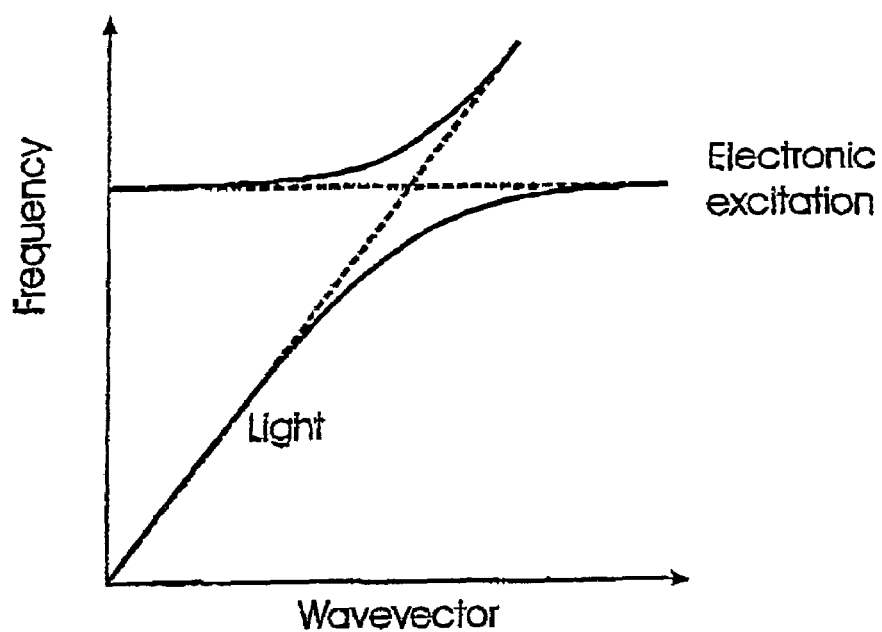
FIG. 1 is a graph showing the polariton spectrum formed by the hybridisation of a dispersing photon mode with an electronic excitation in a solid.
Figure 2:
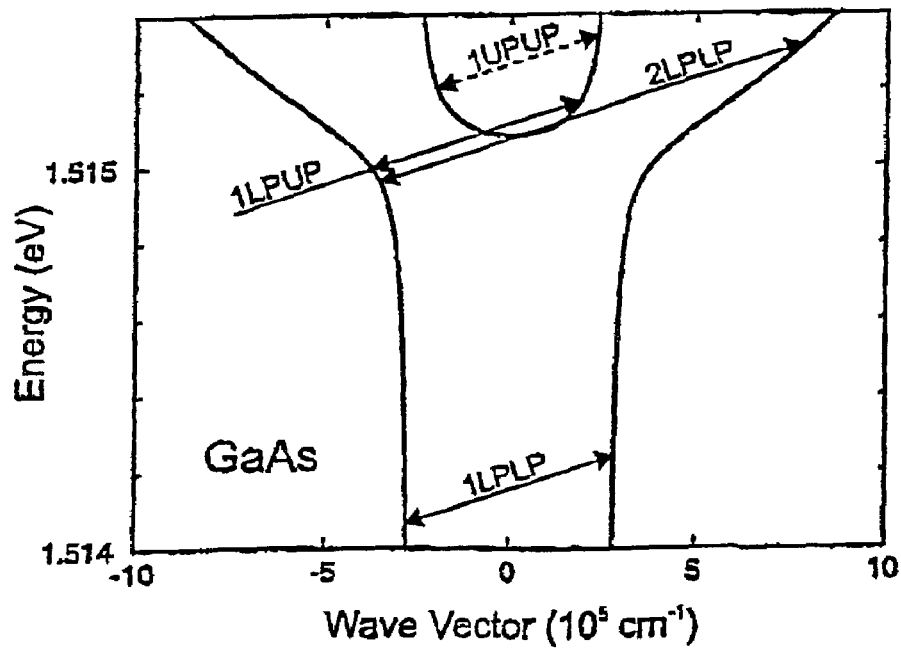
FIG. 2 is a graph showing the polariton spectrum in bulk Gallium Arsenide with the arrowed lines showing coupling between lower (L) and upper (U) polariton (P) branches that can be achieved by a particular acoustic phonon.

In the present invention, an alternative to the Stark effect is used in which acoustically driven excitation-polaritons are probed by weak light. Since an acoustically pumped intrinsic Semiconductor remains in its ground electronic state, no many-body effects influence the acoustic Stark effect and weaken the exciton-phonon interaction. A schematic graph of the polariton energy states in bulk updoped Gallium Arsenide (GaAs), driven by Ghz acoustic wave is shown in FIG. 2.

In the presence of an acoustic wave of wavevector q frequency ω the branches of the polariton dispersion that can undergo degenerate mixing (i.e. the difference frequency and wavevector between the two polaritons is a multiple of the acoustic wave) with the sound wave are strongly changed, while those parts of the dispersion for which the degeneracy condition is not met are hardly changed. Consequently the propagation of light through the sample is modified for specific and tunable frequencies and directions. Apart from very large resonant acousto-optical susceptibilities, the distinction from conventional acoustic-optics is that because of the near-resonance of the light with an electronic excitation, one can modulate the refractive index not just spatially but in frequency.

Figure 3A:
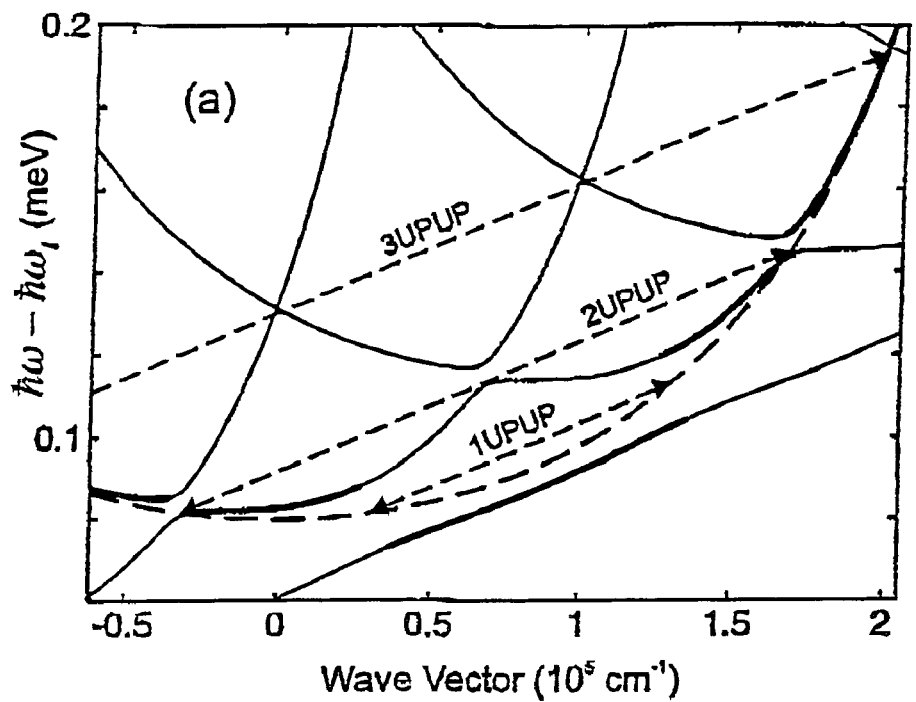
FIGS. 3A and 3B are graphs showing quasi-energy spectrum of modes in the presence of an acoustic pump, with FIG. 3A showing the re-normalised upper polariton branch, and FIG. 3B showing the lower polariton branch.
Figure 3B:
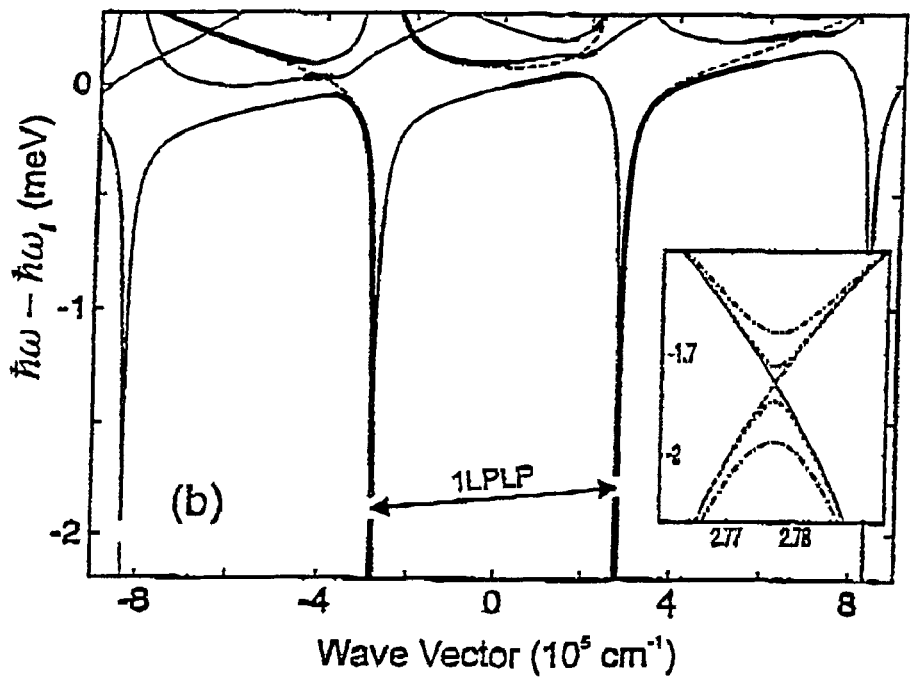

This effect is illustrated in FIG. 3, in which the acoustically induced quasi-energy spectrum=$\omega_P(I_{AC})$ which refers to the upper and lower polariton dispersion branches in Gallium Arsenide, where $I_{AC}$ is the intensity of the sound wave.

According to FIG. 3, spectral stop gaps (optical band gaps) open up and develop in the polariton spectrum with increasing $I_{AC}$ is the intensity of the sound wave.

According to FIG. 3, spectral stop gaps (optical band gaps) open up and develop in the polariton spectrum with increasing $I_{AC}$. The spectral position of the stop gaps refers to the polariton states resonantly coupled by one-, two-, etc. phonon transitions (see FIG. 2).

Figure 4A:
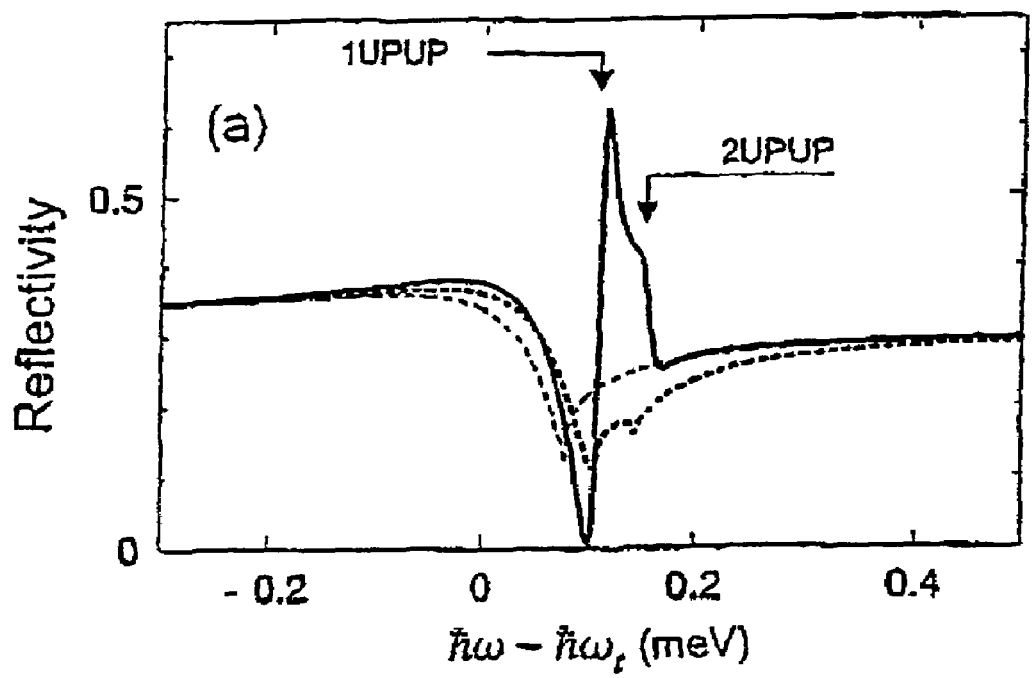
FIGS. 4A and 4B are graphs showing calculated optical reflectivity for the two cases shown in FIGS. 3A and 3B, as a function of frequency measured from the bottom of the upper polariton branch.
Figure 4B:
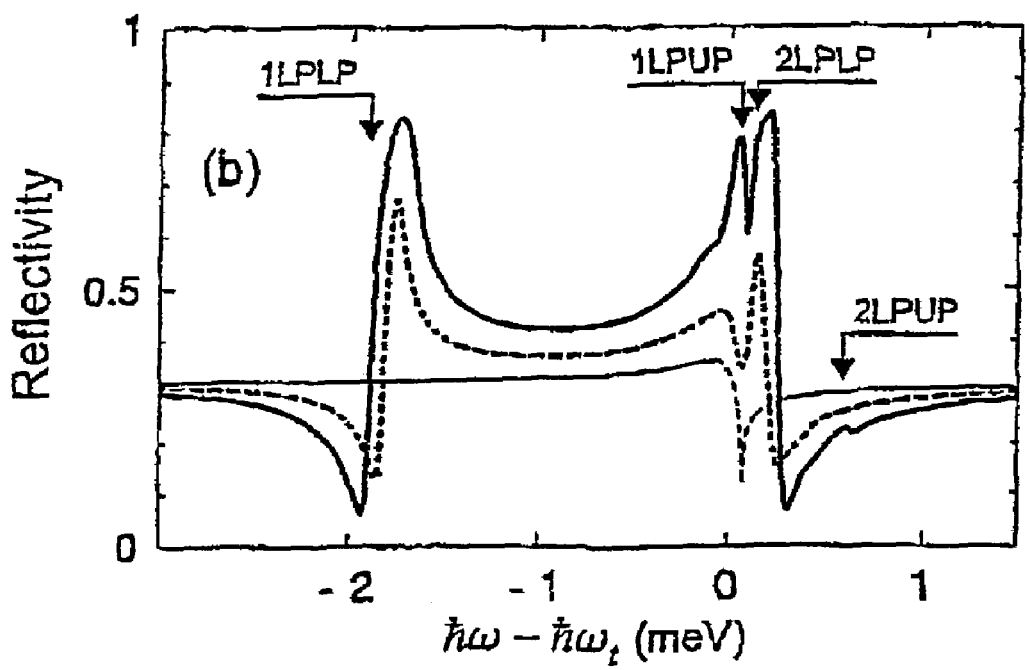

These stop gaps are tunable optical band gaps, that modify the propagation of light through the solid. A simple example is shown in FIG. 4 which is a graph of the reflection coefficient $R=|r(\omega,I_{AC})|^2$, changed by the acoustic wave, for normal incidence of the probe light. The sharp spikes, which are associated with the stop gaps, arise and develop with increasing Iac in the reflection spectrum of acoustically-dressed excitons.

Figure 5:
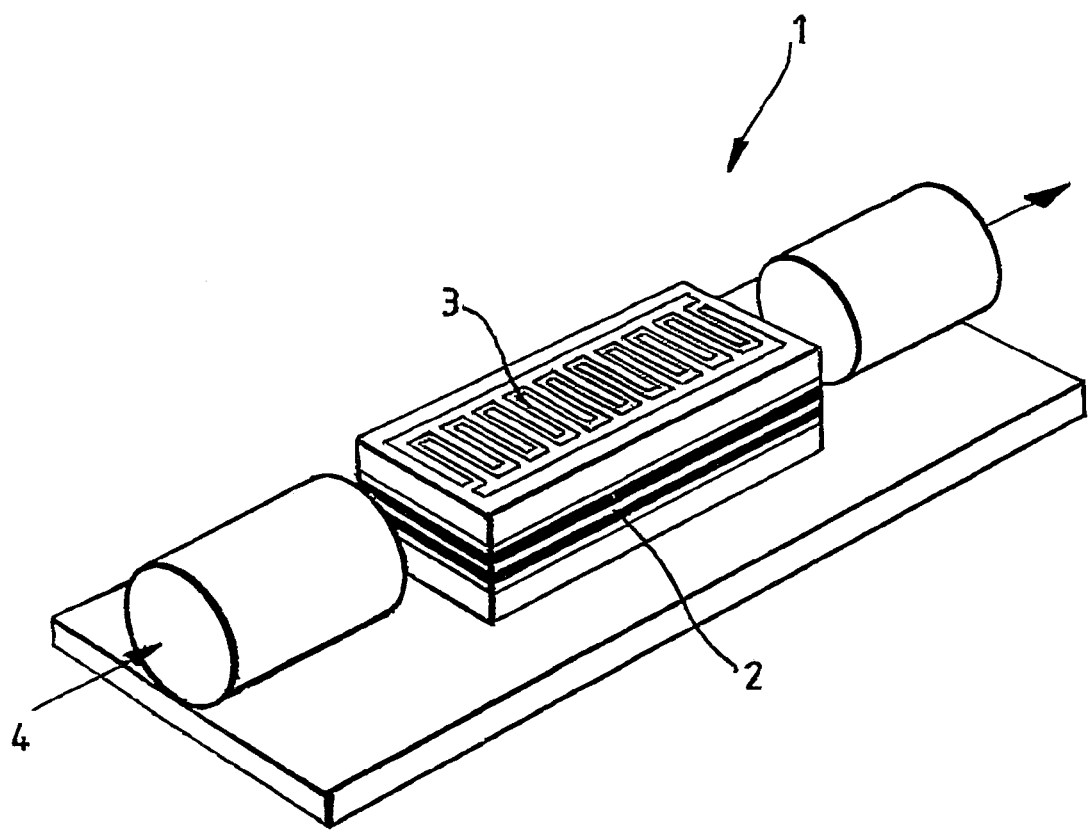
FIG. 5 is a schematic drawing showing an optical switch in the form of a surface acoustic wave modulator on an optical wave guide used as a modulator.

An optical switch 1 is shown in FIG. 5 in which quantum wells 2 are used to confine the excitons, and an optical micro cavity is to used to confine the optical field. The optical device 1 is in the form of a thin film approximately one micron thick. The multiple quantum wells are constructed in gallium arsenide. It is envisaged that the quantum well structure is not essential to the operation of the device, although without the quantum wells, it may be necessary to operate the device at ultra low temperatures. Formed on the upper surface of the device 1 is an inter digital transducer 3 which, as is known in the art, is formed with fingers separated by a predetermined distance in order to determine the frequency of surface acoustic waves generated in the device 1. The transducer converts an electrical signal into surface acoustic waves in the device 1. Since the device is only very thin, the surface acoustic waves are propagated in the whole thickness of the device 1. The signal which is applied to the interdigital transducer 3 affects the optical properties of the device 1. This affects the transmission of laser light 4 through the device 1 from an input end 5 to an output end 6. By applying a surface acoustic wave very close to the resonance of the light, the optical characteristics can be changed enormously in order to prevent laser light 4 of a particular frequency from being transmitted, and by adjusting the frequency of the signal applied to the interdigital transducer 3, the resonant frequency can be changed in order to operate on light of a different wavelength.

Because the stop gap is proportional to the square root of the acoustic intensity, the phonon-induced Stark effect has a dynamic response that takes time to build up the coherent acoustic field. However, in the device of FIG. 5, the semiconductor is very thin, and surface acoustic waves are used which are established very quickly. This is because the wave is driven through its electric component. The piezoelectric coupling between excitons, the surface acoustic wave and the inter digital transducer which generates the surface acoustic wave, reduce the switching times of the Stark effect to the order of a picosecond. The surface acoustic wave-induced optical Stark effect can be realised in semiconductor micro cavities. The thinner the semiconductor, the faster the acoustic field can be built, and the quicker the switching can be.

In this case, the quantum wells use gallium arsenide, but other materials can be used where excitonic levels are more strongly bound, leading to devices which can be operated at high temperatures.

An important characteristic of the device of FIG. 5 it is frequency specific, and can be used to modulate a particular frequency range whilst allowing transmission of light at a different frequency to pass through unchanged. This way, only light within the stop gap band will be modulated. Without any signal applied to the device via the transducer 3, laser light of all frequencies will be transmitted from the input end 5 to the output end 6. However, the application of surface waves at resonance will strongly affect the transmission of light of a particular wavelength passing through the device, whilst leaving other wavelengths to pass through without affect. By changing the voltage of the signal or the frequency of the signal applied to the transducer 3, the optical wave passing through the device can be changed or affected.

The device 1 shown in FIG. 5 is a modulator. The optical wave passing through the device 1 within the stop gap band can be modulated by adjusting the size of the voltage of the signal applied to the transducer 3. Thus, in that band light can be prevented from passing by applying a voltage of sufficient size to the transducer. Of course, transmission levels between the maximum transmission level and the making of the device opaque so that no light travels through allows the light signal be modulated. Alternatively, switching can take place by adjusting the frequency of the signal applied to the transducer 3. By adjusting the frequency, the stop gap band can be shifted to control a different wavelength of light passing through the device 1. Therefore, modulation can be achieved by changing frequency. However, it should be appreciated that the light source, in this case a laser, can transmit several different signals at different frequencies at the same time. The frequency can be set to allow the stop gap band to coincide with any one of those signals, and the magnitude of the voltage applied to the transducer 3 can be used to affect that signal, either by modulation, or by just stopping transmission. Thus, it will be appreciated that this device has tremendous implications in the communications field.

In a further embodiment (not shown) a length of optical fibre can be doped with various rare earth impurities so as to give a resonance at some frequency in the fundamental transparency band of the fibre. A surface acoustic wave transducer can then be formed on the surface of the fibre so that the device can be incorporated into fibre optic cables.

In any embodiment, it is important to understand that such modulators are frequency specific, and can be used to modulate a particular frequency range while allowing transmission of light at a different frequency to pass unchanged.

In these embodiments, there are some important characteristics. Firstly, the acoustic wave leads to modulation of the refractive index of the semiconductor material in both frequency and spatially. The spatio-temporal modulation is tunable according to the relative direction of the light and the sound wave, and the amplitude of the effect is proportional to the sound wave amplitude. Sub GHz tuning of the frequency of the sound wave will shift the spectral position of the optical stop gaps.

Secondly, there is no absorption of the acoustic pump wave, due to the lack of the electronic states relevant for a real phonon-assisted transition in a low temperature intrinsic semiconductor. This means that the intrinsic losses (due, for example, to the generation of electrical carriers in the sample) are minimised.

Thirdly, much smaller acoustic intensities are required than are necessary for the optically-induced Stark effect because polaritons have much larger energy and group velocity than acoustic phonons.

Fourthly, the effect will be observed in general in any condensed medium (solid-state or even liquid) with a well defined fundamental (optical) transparency band and a sharp line, due to an optical resonant electronic transition "embedded" in the band. This includes not just semiconductors, but also glasses (especially doped with transition metal or rare earth elements so as to produce sharp absorption) and organic semiconductors and dyes. It is important that the sharp line should be well separated from the bottom of the nearest populated (ground state) electronband, in order to avoid a thermal population of the electronic states responsible for the sharp line. In addition, the coupling of the electronic states which give rise to the sharp transition in the transparency band with the acoustic field should be strong enough. For example, excitons intrinsic semiconductors or high quality semiconductor nanostructres, optical fibres doped by ions or rare earth impurities (practically no inhomogeneous broadening of the resonant transition associated with ions are very attractive for the resonant acousto-optics in this case).

Fifthly, the modulation is highly frequency specific so that light which is resonant with the acoustic field is strongly affected, while light whose frequency and wavelength is away from the resonance condition will be unaffected.

Further embodiments are also possible, and some examples are described below:

The stop gap has a width in frequency that is tuned by the acoustic intensity. This allows the use of modulator devices and tunable notch filters.

An optical beam splitter can be produced. The resonance condition for the spatial position of stop gaps is satisfied at different frequencies for light propagating in different directions. Thus, light incident at the same angle, but at different frequencies, when in a micro cavity will be diffracted through different angles, because the group velocity depends on the closeness to the mini gap.

A frequency modulator is possible, since, as well as using the effect to modulate the linear response of an incoming signal at a fixed frequency and wavelength, the coupling to acoustic waves can be used to switched signals from one frequency to another, separated approximately by the gigahertz acoustic wave.

The invention claimed is:

1. An acousto-optical device comprising:
   an optical waveguide having an optically transparent electronic band gap and an optical transition which gives rise to a sharp absorption line associated with electronic states within the optically transparent electronic band gap; and
   an acoustic wave generating device for generating acoustic waves within the waveguide,
   wherein the acoustic wave generating device is arranged to generate acoustic waves which change an electronic polarization associated with the optical transition and induce optical band gaps resonantly mediated by the electronic polarization, the acoustically induced optical band gaps affecting the transmission of light passing therethrough that is resonant with the optical transition.

2. An acousto-optical device according to claim 1, wherein the wave generating device is a transducer disposed on the surface of the waveguide.

3. An acousto-optical device according to claim 2, wherein the transducer is arranged to generate surface acoustic waves on the surface of the waveguide.

4. An acousto-optical device according to claim 1, wherein the waveguide includes at least one quantum well for confinement of excitons.

5. An acousto-optical device according to claim 1, wherein the waveguide includes an optical microcavity for confinement of the optical field.

6. An acousto-optical device according to claim 1, wherein the transducer is an interdigital transducer.

7. An acousto-optical device according to claim 1, wherein the waveguide is of the order of a micron in thickness.

8. An acousto-optical device according to claim 1, arranged such that, when no signal is applied to the transducer, the waveguide is transparent, but that, when a signal is applied to the transducer, the intensity of transmitted light in a frequency band is reduced.

9. An acousto-optical device according to claim 1, wherein the device is an optical filter.

10. An acousto-optical device according to claim 1, wherein the device is a modulator.

11. An acousto-optical device according to claim 1, wherein the device is a tunable optical filter.

12. An acousto-optical device according to claim 1, wherein the device is an optical beam splitter.

13. An acousto-optical device according to claim 1, wherein the device is an optical frequency modulator.

14. An acousto-optical system comprising:
   an acousto-optical device according to claim 1; and
   a signal generator for supplying an electrical signal to the transducer.

15. An acousto-optical system according to claim 14, wherein the signal generator is arranged to generate signals in a range of amplitudes to control the intensity of the transmission of the light.

16. An acousto-optical system according to claim 14 or claim 15, wherein the signal generator is arranged to generate signals in a range of frequencies to control the frequency of the band at which light passing through the device is affected.

17. An acousto-optical system according to claim 14, further comprising a light source.

18. An acousto-optical system according to claim 17, wherein the light source is a monochromatic light source.

19. An acousto-optical system according to claim 17, wherein the light source is a laser.

20. A method of affecting the transmission of light through a transparent waveguide having an optically transparent electronic band gap and an optical transition which gives rise to a sharp absorption line associated with electronic states with the transparent electronic band gap, the method comprising applying an acoustic wave to change an electronic polarization associated with the optical transition and induce optical band gaps resonantly mediated by the electronic polarization, the acoustically induced optical band gaps affecting the transmission of light passing therethrough which is resonant with the optical transition.

21. A method according to claim 20, wherein the application of an acoustic wave is the application of a surface acoustic wave to a surface of the waveguide.

22. An acousto-optical device comprising:
   an optically transparent waveguide having an optically transparent electronic band gap and an optical transition which gives rise to a sharp absorption line associated with electronic states within the transparent electronic band gap; and
   an acoustic wave generating device for generating acoustic waves within the waveguide, wherein the wave generating device is arranged to generate acoustic waves which change an electronic polarization associated with the optical transition and induce optical band gaps resonantly mediated by the electronic polarizaiton, the acoustically induced optical band gap affecting the transmission of light passing therethrough that is resonant with the optical transition.

* * * * *